D. S. KENNEDY.
TYPOGRAPHICAL MACHINE.
APPLICATION FILED OCT. 8, 1919.
1,367,606.
Patented Feb. 8, 1921.
7 SHEETS—SHEET 2.
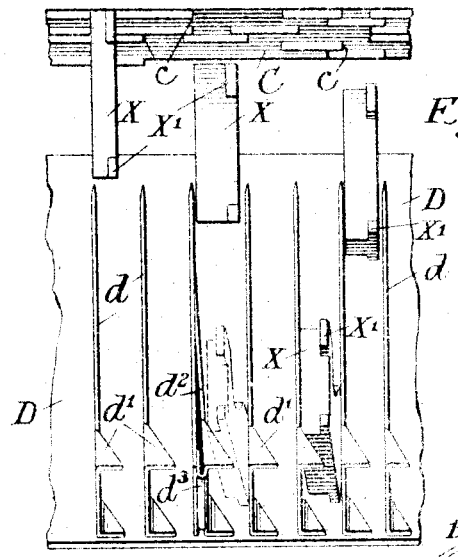
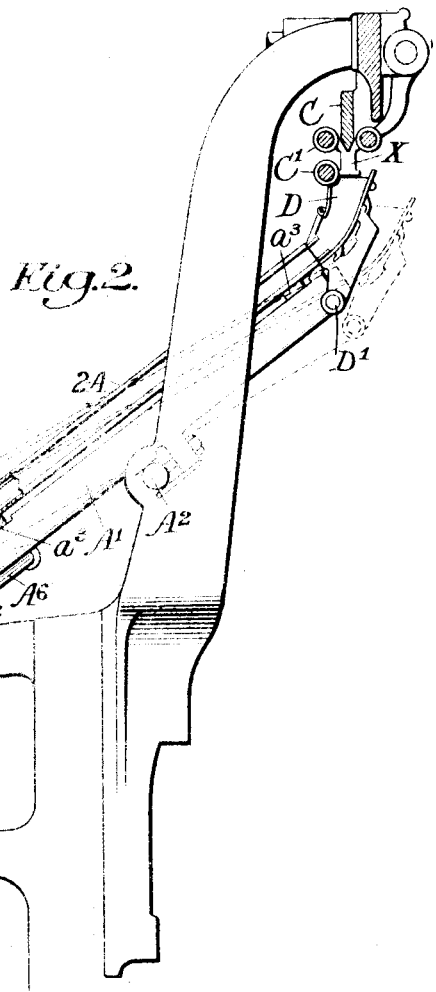
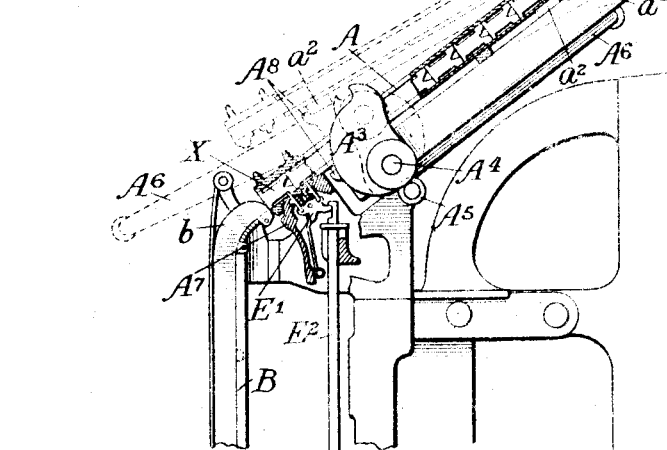
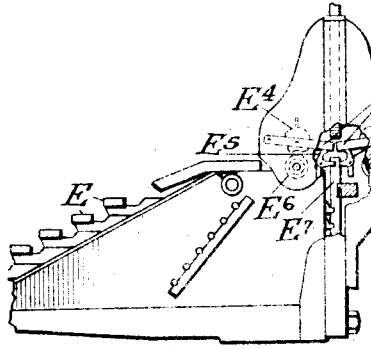
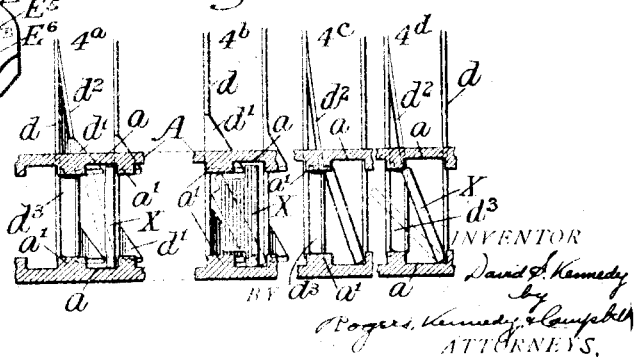

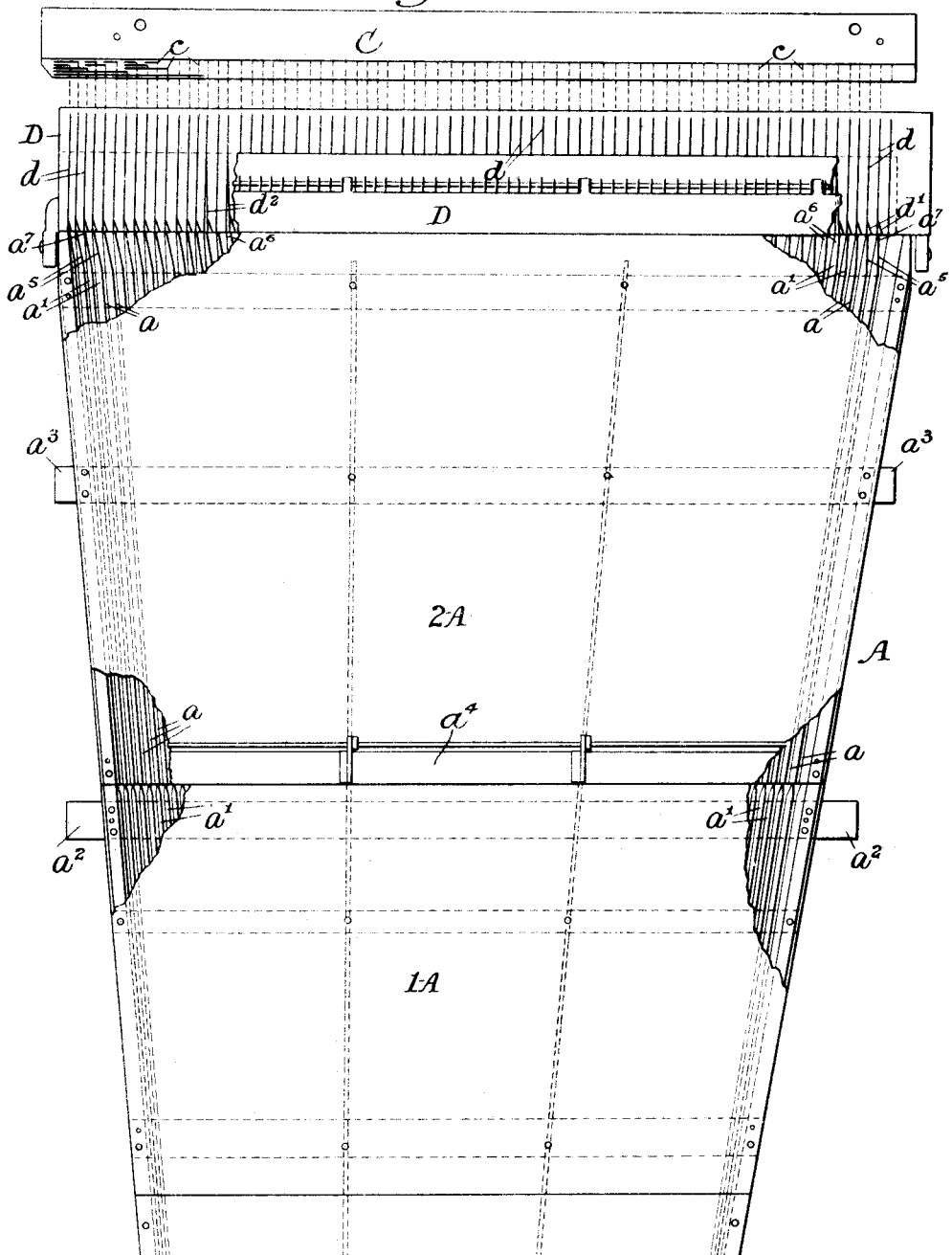

1,367,606. Patented Feb. 8, 1921.
Fig.6.
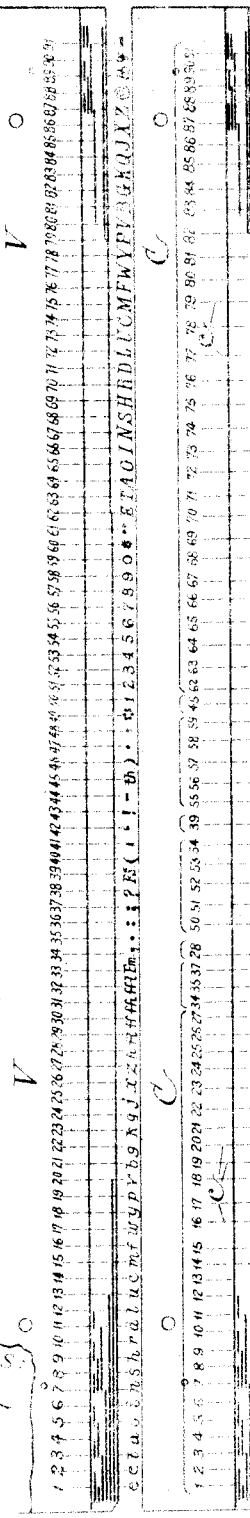
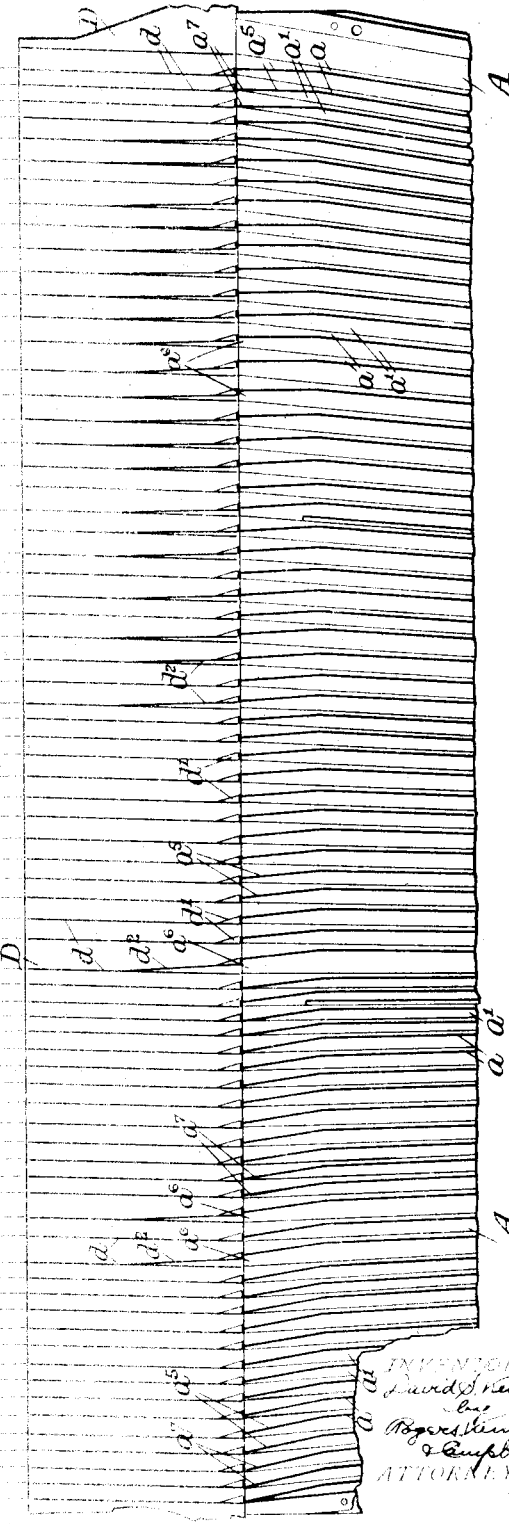
WITNESSES

D. S. KENNEDY.
TYPOGRAPHICAL MACHINE.
APPLICATION FILED OCT. 8, 1919.

1,367,606.

Patented Feb. 8, 1921.
7 SHEETS—SHEET 5.

WITNESSES:

INVENTOR
David S. Kennedy
BY
Rogers, Kennedy & Campbell
ATTORNEYS

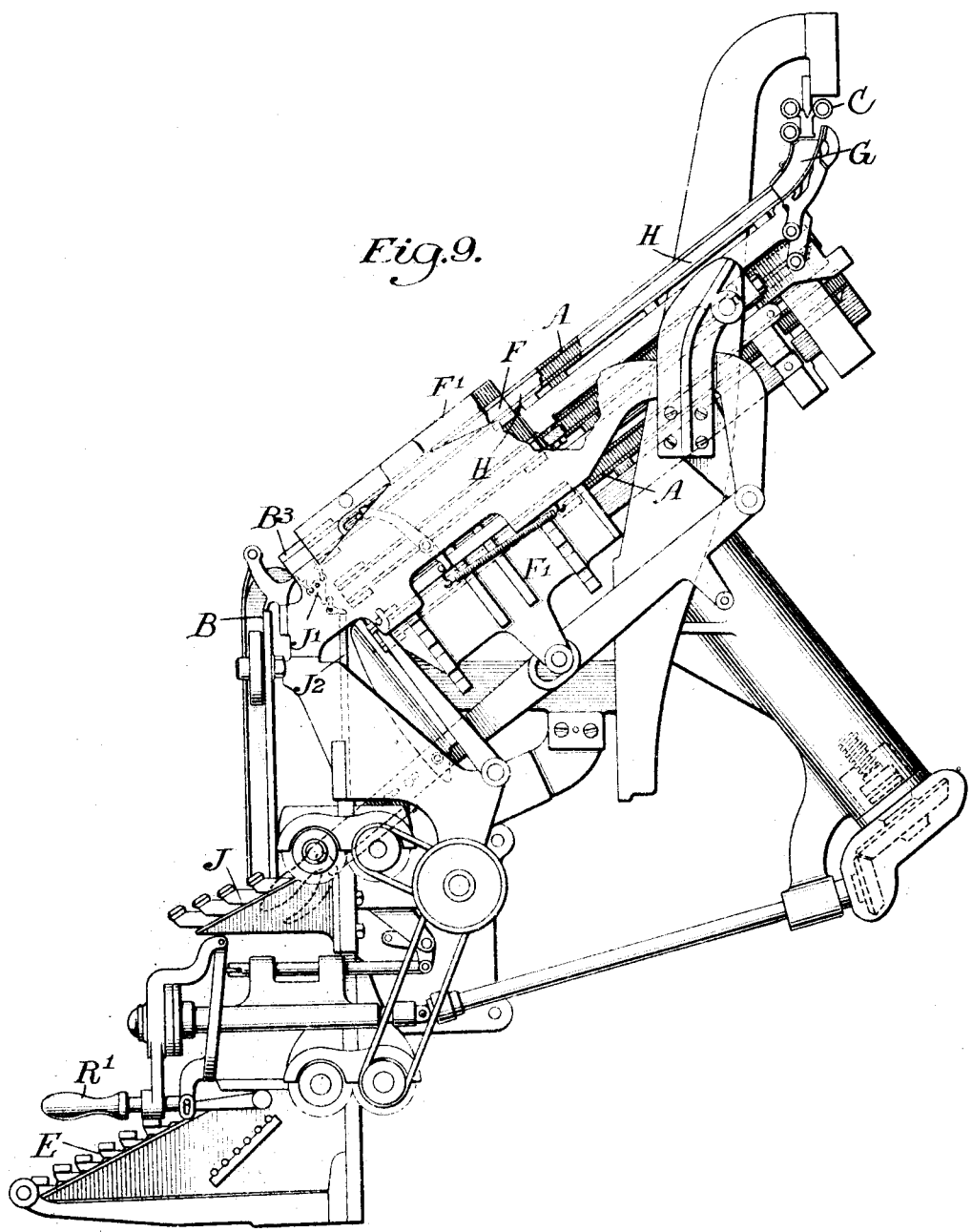

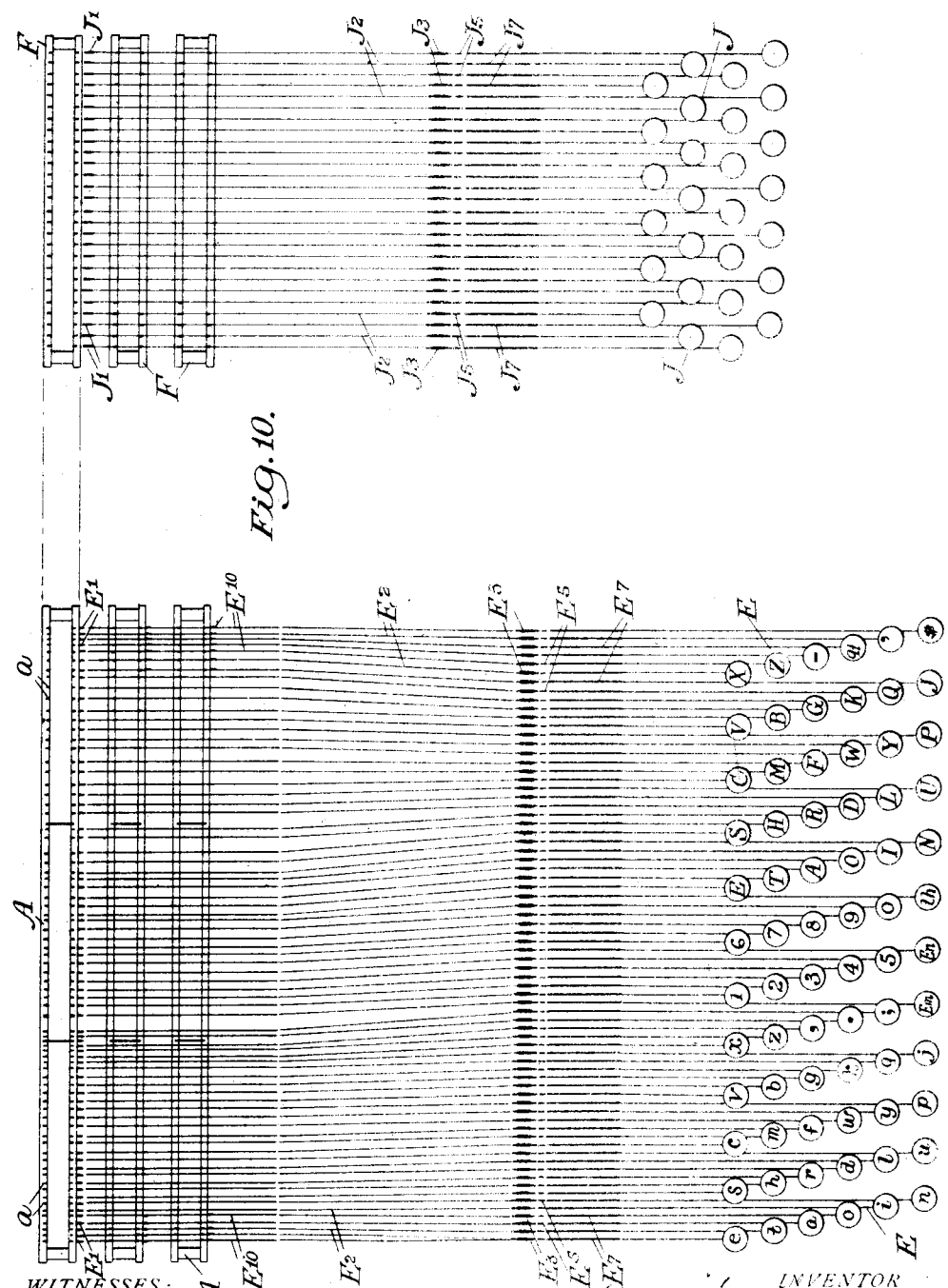

UNITED STATES PATENT OFFICE.

DAVID S. KENNEDY, OF BROOKLYN, NEW YORK, ASSIGNOR TO MERGENTHALER LINOTYPE COMPANY, A CORPORATION OF NEW YORK.

TYPOGRAPHICAL MACHINE.

1,367,606. Specification of Letters Patent. Patented Feb. 8, 1921.

Application filed October 8, 1919. Serial No. 329,338.

*To all whom it may concern:*

Be it known that I, DAVID S. KENNEDY, a citizen of the United States, residing at Brooklyn, in the county of Kings and State of New York, have invented certain new and useful Improvements in Typographical Machines, of which the following is a specification, reference being had therein to the accompanying drawing.

*Kennedy Model 20.*

My invention relates to typographical machines, such as linotype machines of the general organization represented in Letters Patent of the United States to O. Mergenthaler No. 436,532, wherein circulating matrices are released from a magazine in the order in which their characters are to appear in print and then assembled in line, the composed line transferred to the face of a slotted mold, the mold filled with molten metal to form a slug or linotype against the matrices which produce the type characters thereon, and the matrices thereafter returned through distributing mechanism to the magazine from which they started.

In these machines as ordinarily constructed, the size of the matrices is considerably limited, and it is seldom attempted to employ therein matrix fonts above 18 pt. There has long been a demand in the trade for machines capable of handling matrices of larger size, and many efforts have been made to meet such demand. Thus, a special machine has been designed to permit the use therein of matrices assembled or set up by hand in a stick or holder which may be inserted manually in the machine, it being possible in that way to employ matrices of the desired size. These special machines, however, have failed to meet the demands of the trade because they lack the numerous advantages of the regular automatic linotypes, so that other efforts have been made to adapt these latter machines to the new conditions. Thus, it has been proposed to divide an individual matrix font among two regular magazines, devoting each entirely to one-half thereof, but this arrangement is objectionable for obvious reasons, necessitating the use of two distinct distributers, and leading into other complications. It has also been proposed to split the individual matrices of a font in halves and to run the complementary sections of such matrices in the same magazine channels in order that characters of the required width may be used, but this arrangement is likewise unsatisfactory. Various other schemes have been suggested, but it would unduly prolong this specification to discuss them here. Suffice it to say, that of all prior arrangements, none has completely solved the difficulty.

My invention (developed after long experimentation) presents an automatic machine of the regular type which has been found in actual practice to answer completely the various requirements of the trade. This improved machine is not only capable of handling 18 pt. matrices, but matrices of a much larger size, up to 30 pt. wide and above, and this without changing the normal size or dimensions of the other machine elements, which I have found it is desirable and important to preserve. That is to say, in my improved machine, I have not widened or extended the various parts (as might be done and as would naturally occur to one) in order to make use of matrices of the increased size, but I have so modified them otherwise that they will be adapted to handle the larger matrices. The various improvements by which these results are attained will be fully pointed out in the detailed description to follow.

I have herein shown my invention merely in preferred form and by way of example, and obviously many changes and variations may be made therein without departing from its spirit. I therefore desire it to be understood that I do not limit myself to any specific form or embodiment except in so far as such limitations are specified in the claims.

Referring to the drawings:

Fig. 2 is a side elevation thereof, some of the parts being shown in section;

Fig. 3 is an enlarged front view of a portion of the magazine-entrance and distributer bar, with the top plate of the entrance removed, and showing several matrices in different stages of distribution;

Fig. 4 is an enlarged view of an upper portion of the magazine and a contiguous portion of the magazine entrance, illustrating the action of the matrices under different conditions;

Fig. 5 is a plan view (partly diagrammatic) of the magazine, magazine-entrance and distributer bar, certain of the parts being broken away;

Fig. 6 is a view similar to Fig. 5 but on a larger scale, with the top plates of both the magazine and magazine entrance removed to show the interior construction of the parts, and also illustrating the improved distributer bar in connection with one of old construction to bring out by comparison the different arrangements of the bar combinations.

Fig. 9 is a side view of the machine shown in Fig. 8 when equipped with a plurality of supplemental magazines; and Fig. 10 is a diagram of the actuating connections between the keyboards and the magazines of the machine shown in Fig. 9.

Figure 1:
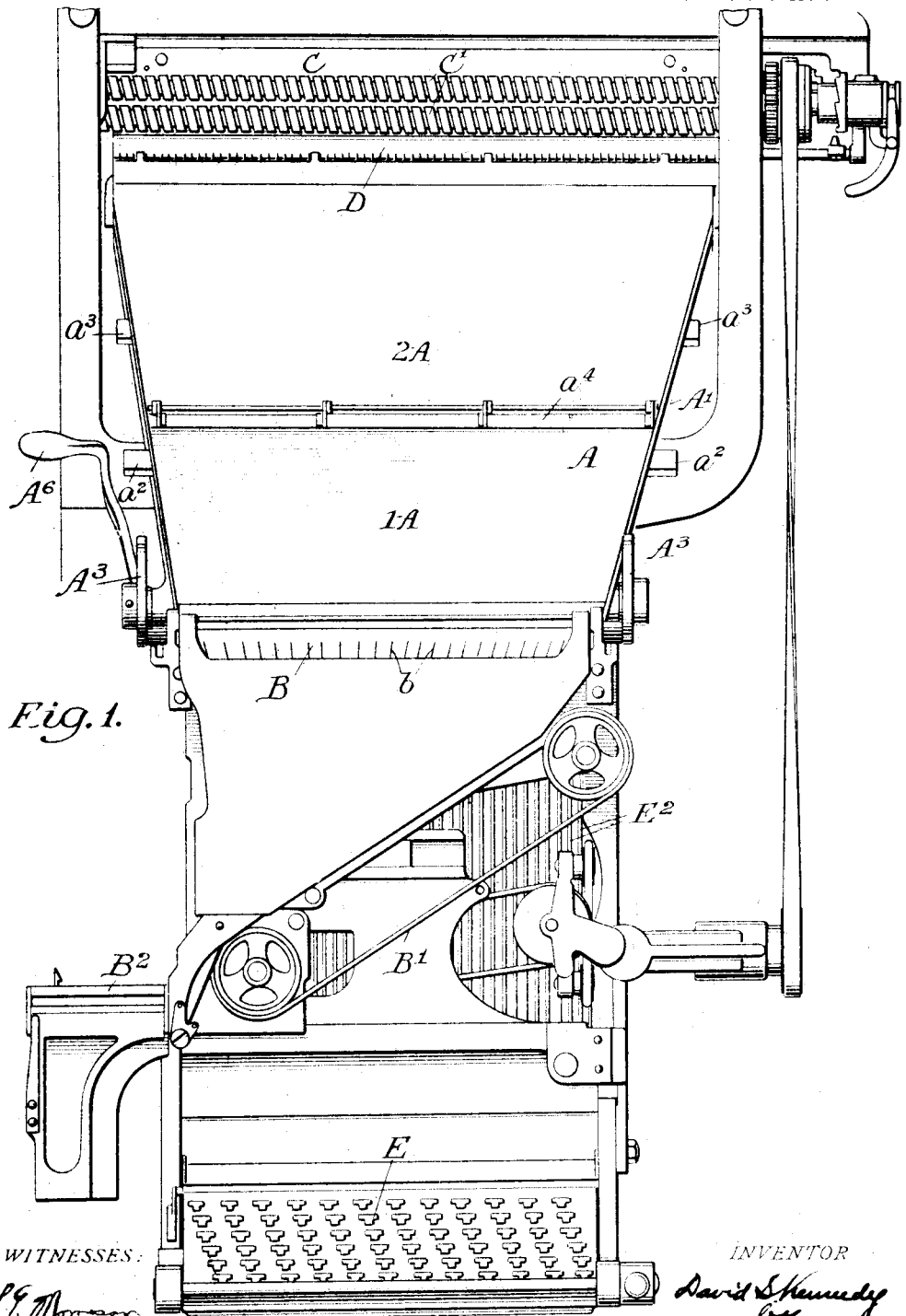
Figure 1 is a front elevation of a portion of a linotype machine having my invention embodied therein.

The matrices X are stored in the channeled magazine A and are released therefrom by the escapements $E^1$ (Fig. 2) under the influence of the keyboard E, whence they pass through the channeled front-plate or raceway B onto the inclined conveyer belt $B^1$, which delivers them to the assembler $B^2$ wherein they are composed in line. After casting, the matrices are carried upward and transferred one at a time to the distributer bar C along which they are propelled by the conveying screws $C^1$ and which releases them at different points in its length according to character and drops them into a channeled magazine-entrance D for return to their proper channels in the magazine.

As before stated, it is the primary object of the present invention to provide a machine capable of handling matrices of much larger size than has heretofore been possible. In prior machines, the limitation as to size of the matrices is due in a large degree to the form and construction of the magazine and the associated parts. As is well known, the standard or regular linotype magazine is of trapezoidal shape and is formed with grooved channels which converge from its wide receiving end to its narrow discharge end, there being ninety-one of such channels, two for the letter "e" and one for each remaining character of the ordinary ninety-character fonts. Now it is apparent that the matrices employed in these machines must be of such size or thickness as will permit them to pass through or from the discharge end of the magazine irrespective of the conditions which exist at other places in the machine. Hence it is essential that in the prior machines the size of the largest complete matrix font is limited to 18 pt., unless extremely condensed. The natural and logical remedy for such a condition would seem to be to widen the magazine at its discharge end sufficiently to accommodate matrices of the desired size, and this has been done to some extent, but there are practical considerations which make it very undesirable to go beyond a certain limit or certainly to such an extent as would be necessary to accommodate matrices of the size herein proposed. For instance, any considerable widening of the magazine would not only seriously interfere with the speed of composition and cause transpositions of the matrices, but in addition, it would necessitate a corresponding extension of the keyboard and distributing devices and thereby lead to further complications. These and many other reasons will be readily appreciated by those skilled in the art, and it therefore seems unnecessary to discuss them at any further length. The point is that the extent to which the magazine may be widened within the desirable limits, is altogether too small to permit any material increase in the size of the matrices, so that to enable the machine to handle larger matrices under such conditions presents a problem which I believe I am first to solve satisfactorily.

The scheme which has finally been hit upon will permit the use in the machine of matrices as large as 30 pt. wide without widening the magazine either at its discharge or receiving end and without involving any extension of the associated parts, thus enabling the normal size and dimensions of the various parts to be preserved and avoiding any of the disadvantages which would arise from any change thereof. Generally speaking, the present invention contemplates the employment of matrix fonts comprising materially less than the standard number of characters, that is to say, but seventy-two characters as distinguished from ninety characters of the ordinary fonts, the characters eliminated being those of the combined letter variety such as "fi" "fl" "ffi," etc., and a few miscellaneous characters; and the space which would otherwise be taken up by these omitted characters in the different parts of the machine is utilized to enlarge the space devoted therein to the remaining characters of the font in such manner that the individual matrices may be increased in thickness in proportion to the additional space afforded by the reduced number of characters. This will become clearer from the detailed description now to follow:

Referring first to the magazine A, it is of the regular trapezoidal shape and is provided on the inner faces of its top and bottom plates with series of ribs $a'$ presenting sets of opposing grooves $a$ (Fig. 5), which converge from the upper to the lower ends thereof and provide channels wherein the projecting ears $X^1$ of the matrices X engage. As shown, there are seventy-three such grooved channels $a$, two for the letter "e" and one for each remaining character of the new font, and these channels as so reduced in number are spaced apart throughout the entire width of the magazine. As illustrated in Fig. 5, the grooved channels converge from unequally spaced points at the upper or receiving end of the magazine to unequally spaced points at its lower or discharge end, which points are determined with reference to the varying set widths of the different characters of the largest matrix font, those at the lower end of the magazine being located to provide for the discharge of the matrices from the respective channels without interference, and those at the upper end thereof being located to provide for the distribution of the matrices into said channels. It is pointed out, however, that in determining these points, the increased space afforded by the reduced number of channels (namely, seventy-three) is divided or apportioned among them at both their lower and upper ends, not equally, but proportionately according to the varying set widths of the different characters of the largest matrix font, so as in this way to take full advantage of the increased space. In this connection, it may be noted that in the existing linotype machines, the matrix channels while unequally spaced at the discharge end of the magazine are equally spaced at its receiving end. The same arrangement might be employed in the present instance (in which case the increased space should be apportioned equally among the matrix channels at their upper ends), but it would either limit the size of the matrices to a small extent or else require a slight widening of the magazine at its receiving end. By spacing the channels as above described, neither of these conditions exists, as matrices of the largest size capable of passing through the discharge end of the magazine may be distributed into its receiving end, as will later appear.

Figure 7:
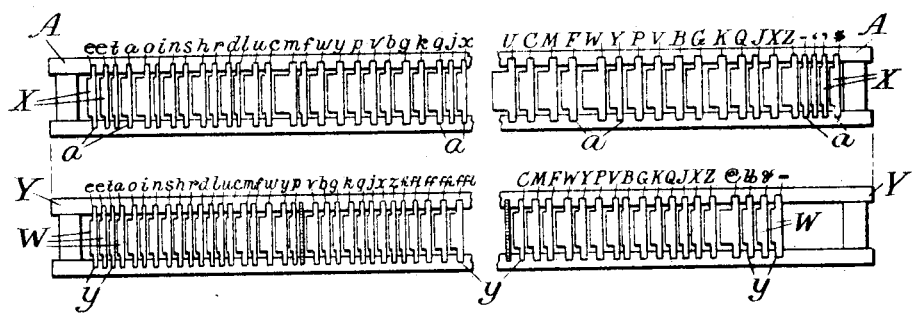
Fig. 7 is an end view at opposite sides of two magazines, one of improved construction and the other of old construction, and showing by comparison the difference in arrangement of the grooved channels and in the size of the matrices capable of being stored therein.

Although differing radically in number and arrangement of its grooves $a$, the magazine A is the same in size or width throughout as the standard or regular "Model 5" magazine now in general commercial use. The difference in the number and arrangement of the grooves is illustrated in Fig. 7, which shows at the discharge end a portion of the improved magazine A in comparison with a similar portion of a "Model 5" magazine Y, which latter of course is formed with ninety-one sets (the standard number) of grooves $y$, spaced apart in the usual manner. From this comparison, it will be seen that, due to the novel spacing of the grooves of the improved magazine, the size of the matrices X stored therein is considerably greater than that of the usual matrices W contained in the regular magazine, although both magazines are of the same width. The increased space thus provided in the magazine A amounts approximately to 25% and when apportioned among its channels as above described enables them to accommodate matrices of correspondingly increased size. The improvements in this regard, therefore, reside in a magazine of substantially standard width at its discharge end, and preferably at its receiving end as well, but having materially less than the standard number of matrix channels to enable said magazine to accommodate a correspondingly reduced number of columns of extra thick or display matrices of the maximum size for that number, the said channels, preferably at both their lower and upper ends, being unequally spaced apart throughout the entire width of the magazine and having the increased space afforded by the reduced number thereof apportioned among them in such manner that the distances between the various channels at the discharge and receiving ends of the magazine vary according to the setwise dimensions of said extra thick or display matrices. Such improvements give rise to many advantages, some of which have been previously mentioned, and others of which will be apparent to those skilled in the art. However, it is emphasized that a primary object in making the magazine as above described is because it has been found the best results can thus be obtained. For instance, when of substantially standard width at its discharge end, the magazine on the one hand is wide enough to contain a sufficient number of columns of the extra thick or display matrices for practical composition, and on the other hand is sufficiently restricted in width to permit said matrices to be assembled in line rapidly and without danger of transpositions or damage to themselves. And similarly, when of substantially standard width at its receiving end, the magazine is wide enough to provide for the proper distribution of the extra thick or display matrices by mechanism of the general type ordinarily employed (which comprises a partitioned magazine entrance and a ribbed distributer bar) and yet is sufficiently restricted in width to permit such distribution to be carried out rapidly and at a speed in harmony with that of the assembling operation, both of which features are particularly useful in connection with the sectional magazine herein described and illustrated.

It will be understood that the present invention does not require that the dimensions of the improved magazine be identical with the dimensions of the standard or regular "Model 5" magazine, but only substantially so, as of course a slight variation from these dimensions would not affect the result one way or the other.

It will be also obvious that the number of channels in the improved magazine may be varied to accommodate matrices of other sizes, although the precise number herein disclosed is particularly advantageous, in that it not only provides a wide range of sizes of matrix fonts, but in addition, furnishes a satisfactory assortment of characters, which as may be seen from the keyboard shown in Fig. 10 includes lower and upper case characters, figures and other miscellaneous characters.

It has been made clear that the restriction in width of the magazine at its discharge end does not necessarily apply to its receiving end, whose width depends mainly upon the form of distributing mechanism employed. Thus, in a known form of such mechanism, the magazine might be made of less than normal width at its receiving end, if that were desired. However, the present invention has been designed to permit the use of a magazine entrance and distributer bar of normal dimensions in effecting the distribution of the matrices so as to make as little change as possible in the existing parts. As the magazine A is of the same width at its receiving end as the standard or regular "Model 5" magazine, as above described, the magazine entrance D may be and is of the same width as the regular ninety-one channeled magazine entrance which coöperates with such standard magazine, but the number and arrangement of the partitions $d$ which divide it into matrix channels have been changed so as to provide but seventy-three such channels, one for each channel of the magazine and of a width suitable for matrices passing therethrough. That is to say (Figs. 5 and 6), the partitions $d$ when thus reduced in number are spaced apart throughout the entire width of the entrance and are separated different distances from each other so as to apportion the full space of the entrance among the seventy-three intervening channels in accordance with the set widths of the different characters of the largest matrix font, it being remembered that the magazine grooves $a$ are unequally spaced apart at their upper ends to correspond with the varying widths and locations of the entrance channels. In the present instance, then, the increased space afforded by the reduced number of entrance channels is divided or apportioned among them proportionately according to the varying set widths of the different characters of the largest matrix font. In this way, the normal width of the entrance is preserved, whereas if the various channels were made of equal width, as in existing linotype machines, the size of the matrices would have to be reduced to some extent or else the entrance made wider.

Similarly, the distributer bar C is of the same length as the regular ninety-one combination bar employed in connection with the Model 5 magazine and magazine entrance. However, to adapt it to its new conditions, the bar C is formed with only seventy-three combinations $c$, one for each channel of the magazine and magazine entrance, and these combinations are spaced apart throughout the entire length of the bar, and at unequal distances, so as to correspond with the location of the entrance channels. That is to say, the increased space afforded by the reduced number of bar-combinations is divided or apportioned among them proportionately according to the varying set widths of the different characters of the largest matrix font. Hence, the normal length of the bar is preserved, whereas if the combinations were equally spaced apart, as in existing linotype machines, the size of matrices would have to be reduced to some extent or else the bar made longer to permit their distribution into the magazine entrance.

The distributing parts as so modified and when employed in connection with the improved magazine and the modified assembling mechanism, thus provide a machine wherein matrices of greatly increased size may be used, marking a distinct and important advance in the art and opening up a field which has heretofore been closed to machines of the regular linotype variety.

Further improvements have been made in the distributer bar to adapt it to handle matrices of the ordinary ninety-character fonts as well as those of the seventy-two character fonts herein. This feature is of great advantage, in that it enables any of the outstanding fonts to be used in the present machine and even some of the new reduced fonts in the existing linotype machines, thus effecting a great saving to the user and avoiding a multiplicity of fonts of the same face or point. It is well known that the regular distributer bar is formed on opposite sides with seven longitudinal ribs which are cut away at different points in the length of the bar to provide the matrix releasing combinations $c$ before referred to, this cutting away of the ribs being carried out in strict accordance with the combination system provided by that particular number of ribs. The greatest number of combinations possible under the above system is about one hundred twenty-six, and to provide for the release of the matrices at as many different points, it is necessary that these combinations run in systematic rotation throughout the series, so that matrices to be released from the more distant combinations will be carried across or past the preceding combinations. That is to say, the ribs must be cut away in such manner that the first, second and third bar-combinations are the first, second and third combinations of the one hundred twenty-six possible, and so on throughout the series. The matrices of course are formed with corresponding tooth combinations running in the same order throughout the front, it being understood that each matrix is formed with as many teeth as there are ribs cut away at the particular point at which it is to be released. This method is well known and requires no further discussion. The point here involved is that the regular linotype distributer bar has always been made with its ninety-one combinations arranged in this systematic rotation, that is, with the first ninety-one combinations of the possible one hundred twenty-six.

This would be the obvious method to follow in constructing the present distributer bar, that is, omit the last eighteen combinations from the bar and space the first seventy-two in the manner above described. However, if this were done, it would result in a wide discrepancy between the tooth combinations of the improved matrix fonts herein proposed and the ordinary matrix fonts, as the matrices of the new fonts would have different tooth combinations from those of matrices bearing the same characters in the old fonts. Although the rearrangement of tooth combinations on matrices under such conditions is very common and has been resorted to in many instances to effect a rearrangement of the characters in the magazine, if such practice were followed in the present instance, it can be seen that the interchange of the present fonts with the ordinary fonts would be impossible.

To overcome the foregoing objection and to attain the object before stated, the distributer bar C is herein constructed with its series of combinations c divided into groups, which combinations are arranged in systematic rotation within the groups but in interrupted rotation as between the groups, although running in proper sequence throughout the groups. That is to say, instead of cutting away the ribs of the bar so that the seventy-two combinations will run in rotation according to the combination system, as in the case of the old distributer bar, they are cut away in such manner that the combinations at certain places in the length of the bar run in regular rotation and at other places in irregular or interrupted rotation. Notwithstanding the peculiar disposition, the various combinations have been arranged in the proper sequence, so that each matrix in passing to its point of release on the bar will remain suspended by the ribs over which it passes before reaching such point.

The new arrangement will be entirely clear from an examination of Fig. 6 wherein the new bar C is shown in comparison with the old ninety-combination bar V, the releasing points of the bar combinations being indicated by the dotted lines. The numbers applied to the two bars are intended to denote the arrangement or rotational order of the various combinations, while the letters and marks below the bars are intended to represent the particular matrices which are dropped at the different releasing points of such combinations. In the case of the old distributer bar V, it will be observed, the combinations run consecutively from 1 to 91, being the first ninety-one combinations that are possible according to the seven-rib combination system. In the case of the new bar C, on the other hand, it will be noticed that the consecutive arrangement of the combinations is interrupted at various points in the length of the bar, not only by the omission of certain combinations but also by the transposition of some of them. Thus, the bar combinations c are divided into eight distinct groups, the first comprising Nos. 1–27; the second, Nos. 34, 35 and 37; the third, No. 28; the fourth, Nos. 50–54; the fifth, No. 39; the sixth, Nos. 55–59; the seventh, No. 45; and the eighth and last, Nos. 62–91. The eighteen omitted combinations, therefore, are Nos. 29–33; 36; 38; 40–44; 46–49; 60; and 61. It will now be plain that the seventy-two combinations of the improved bar do not run consecutively from 1 to 72, but are arranged in rotation only within the different groups, being interrupted or arranged out of rotation as between the groups. It can be seen also that this interruption as between the groups in the embodiment illustrated is due not only to the omission of certain intervening combinations, but also to the transposition of those retained. Thus, the single combination of the third group is No. 28, although the combinations of the preceding group are of higher order, namely, Nos. 34, 35 and 37; and the same is true of the fifth and seventh groups. This arrangement of one combination after another of higher order would not ordinarily be possible, but it is permitted in the present instance because of the omission of the particular combinations mentioned. It is clear, therefore, that the present scheme presents a distributer bar constructed on an entirely new plan.

The effect of the improved arrangement will be apparent from a comparison of the numbers and characters of the two bars; and it will be found that, except as to five of them, every combination of the new bar C has the same character associated therewith as the corresponding combination of the old bar V, which means that the matrices of the new seventy-two character fonts are provided with the same tooth combinations as those of the ordinary ninety-character fonts with the five exceptions noted. The excepted matrices are those for the "em," hyphen, apostrophe, and quotation and dollar marks, and their tooth combinations have been made to correspond respectively with the combinations Nos. 28 and 88-91 of the new bar C, it being noted that the corresponding matrices of the ordinary font are formed respectively with tooth combinations corresponding to the omitted combinations Nos. 33, 44, 42, 48 and 60 of the old bar V. However, this condition will present no serious handicap, as the main consideration is to avoid changing the tooth combinations on the letter and figure matrices, which make up practically the whole of the font. As a result, since practically all of the matrices of the new fonts are provided with the same combinations as those of the old fonts, the matrices of the latter fonts when used in the present machine will be dropped from the new distributer bar at the required points to enter the appropriate magazine channels; notwithstanding the totally different arrangement of the latter. And when any of the new fonts (those small enough) are used in the existing machines, the matrices will be released from the old distributer bar at the proper though different points to enter the appropriate channels of the regular magazine. The improved form of distributer bar is further advantageous in that it permits the matrices to be stored in the magazine in such order as to enable the finger keys of the keyboard to be arranged in substantially the same way as those of the regular keyboard.

Further improvements have been made in the magazine and magazine entrance to insure the proper delivery of the matrices from the latter to the former. As shown more particularly in Fig. 6, the magazine ribs $a^1$ are tapered or beveled at their upper ends as at $a^5$, so as to flare or widen the mouths of the intervening grooves $a$ and thus to facilitate the engagement therein of the projecting ears $X^1$ of the matrices X. Heretofore, these magazine ribs have been tapered to a point so as to aline with the partitions of the magazine entrance and to make the flared portions of the grooves as wide as the entrance channels with which they communicate, the idea being to insure the engagement of the matrix ears in the magazine grooves. It has been found that the construction of the magazine ribs in this manner is not entirely satisfactory in the present machine, due to the extreme widths of some of the entrance channels, which under the old conditions would require such an excessive flaring of the magazine grooves as would allow the thinner matrices to become disengaged therefrom in their passage from the entrance channels (see Fig. $4^a$). In the present instance, and as clearly shown in Fig. 6, the magazine ribs, instead of being brought to a point as before, are beveled to different extents according to width, that is to say, the wider ribs (as $a^6$) which separate the grooves for the larger matrices are beveled only part-way across so as to leave the flared mouths of such grooves narrower than the corresponding entrance channels, although the narrower ribs (as $a^7$) which separate the grooves for the thinner matrices are beveled clear across so as to make the mouths of such grooves as wide as the corresponding entrance channels as before. Actual practice has shown that the best results are obtained when the flared portions of the grooves are about one-quarter of an inch wide, so that the beveling of the ribs herein has been carried out to secure this width throughout all of the grooves. While desirable, it is not essential that the flared portions of the grooves be of such uniform width, as they might be made to vary within certain limits if that were desired. The point is that, for the larger entrance channels, the flared mouths of the corresponding magazine grooves should be of less width and such that when the thinner matrices enter the grooves, their opposite side-walls will be close enough to prevent the matrices from tilting over so far as to be disengaged therefrom (see Fig. $4^a$). As so constructed, the magazine ribs will of course extend partway across the entrance channels, but this condition is not objectionable by reason of the improvements made in the magazine entrance now to be described.

The entrance D is provided with supplemental guiding means to engage the matrices as they pass therethrough and direct them in proper position and under positive control into the proper channels of the magazine. Such means are presented in the Butts Patent No. 1,099,486 and are embodied herein in precisely the same form for most of the channels, consisting of guiding surfaces or bent over flanges $d^1$ projecting in pairs into the entrance channels from the partitions $d$ in position to engage the projecting ears $X^1$ on the opposite edges of the matrices X. Hence, and as more fully brought out in the Butts patent, the individual matrices, though of varying thicknesses in the different fonts, will be guided from the entrance channels in a straight or upright condition and caused to enter the magazine grooves in proper position. It will now be apparent that all danger of the matrices striking the ends of the wider magazine ribs is completely removed, as the projecting ears of the matrices are deflected away from such ribs and guided past them by the flanges $d^1$.

However, there is a further difficulty arising from the use of the extremely wide entrance channels which has had to be overcome. When the thin matrices are run through these wider channels, they are apt to topple over so far that their projecting ears will not be engaged by the guiding flanges $d^1$. This condition is illustrated in Fig. 4$^b$, which shows by the full lines a thick matrix under control of the flanges and by the dotted lines a thin matrix which has passed beyond their control due to the abnormally inclined position which it can assume within the entrance channel. (See also Fig. 3). Such a thin matrix, therefore, may jam and cause a piling up of the succeeding matrices. To overcome this difficulty, the guiding surfaces or flanges $d^1$ for such wide channels are located on relatively inclined leaf sections or tongues $d^2$ (Fig. 3) suitably joined at their upper ends to the partitions $d$ about midway of the channels and having their lower ends turned back on themselves within the channels to form loops $d^3$ which act as spacers to separate the tongues from the partitions and hold the former at the required inclination. As a result of this arrangement, the affected channels are contracted in width in advance of the guiding flanges $d^1$ to such extent that while the larger matrices may pass freely therethrough, the thinner ones will be prevented from falling over so far as not to present their projecting ears to the guiding action of the flanges, this being brought about of course by the tongues $d^2$ which guide the matrices by their side faces until their projecting ears become engaged by the flanges. It will also be apparent that the tongues materially assist the flanges in preventing the matrices from striking the ends of the wider magazine ribs, which would extend across the channels and beyond the flanges if the latter were used alone. These tongues are further advantageous in that they permit the use of single partitions as the side-walls for adjoining entrance channels when otherwise extra partitions might be necessary, and in general they allow the channels to be made wider for any purpose. In addition, the tongues serve to contract the widths of the entrance channels without altering the positions of the partitions constituting the side-walls thereof, which feature is particularly useful when it is desired to change the width of one channel without affecting the width of the adjoining channel, as would necessarily result by the adjustment of the partition itself.

Fig. 4 is intended to bring out the utility of the leaf sections or tongues $d^2$ when provided with the guiding flanges $d^1$. It has already been seen how, as illustrated in Fig. 4$^b$, a thin matrix might fail to enter the magazine if the guiding flanges alone were used for the larger entrance channels. Fig. 4$^c$ indicates what might take place if the tongue were used without the flange, a matrix being shown caught by the square end of the upper magazine rib which extends beyond the tongue. In Fig. 4$^d$ the magazine ribs have been beveled off sufficiently to avoid the danger pointed out in Fig. 4$^c$, but this has resulted in the widening of the mouth of the grooves to such an extent that the matrix after it enters the grooves may fall over and become completely disengaged therefrom (see dotted lines). Fig. 4$^a$ illustrates the correct action of the parts as insured by the combined use of the tongue and flange, showing by the full lines a thin matrix in the final position which it is caused to assume as it leaves the entrance channel, and by the dotted lines the extreme position which such matrix might take after it has partly entered the magazine grooves, it being observed that the matrix is arrested in its tilting movement by the upper magazine rib which is beveled only part way across so as to leave the flared mouth of the grooved channel of proper width.

It remains to be described how the matrices are released from the magazine. Any suitable form of mechanism may be employed for this purpose, and as a matter of fact, the regular keyboard might be made use of if desired, as it would be merely necessary to connect the proper finger keys with the escapements of the corresponding magazine channels. However, as the number of characters in the matrix font has been reduced to seventy-two, it is proposed to effect a corresponding reduction in the number of finger keys and intermediate parts. In the present arrangement, therefore, the keyboard comprises but seventy-two keys, one for each character of the new font, and the intermediate parts are reduced to correspond. In making this reduction, the finger keys have been rearranged and spaced apart at increased distances according to the additional space provided by the reduced number thereof, so as to make up a keyboard substantially as wide as the discharge end of the magazine, the keys being disposed symmetrically in six horizontal rows or banks as customary but in only twelve vertical tiers, thus making up the seventy-two characters. This arrangement, though not essential, is very desirable in that it not only simplifies the construction of the parts but in addition presents a keyboard of standard dimensions and one with which operators are most familiar.

Referring now in detail to the construction of the parts (Fig. 2), the escapements E¹, one for each channel of the magazine, are actuated in the usual way by the corresponding series of reeds E² which in turn are operated by the yokes E³ arranged in banks and provided with the cams or eccentrics E⁴ adapted under the influence of the trip dogs or triggers E⁵ to coöperate with the underlying power driven rolls E⁶, the triggers E⁵ being controlled from the finger keys E through the intermediate actuating slides E⁷. This arrangement of the parts is illustrated diagrammatically at the left in Fig. 10, wherein they are shown as embodied in a multiple magazine machine later to be described. It will be noted that, whereas the escapements E¹ are spaced unequally apart to accord with the spacing of the magazine grooves $a$, the cam yokes E³ and the finger keys E are equally spaced apart, the increased space afforded by the reduced number of these parts being divided or apportioned among them equally. Hence, the finger keys stand in the same vertical planes as the cam yokes and are connected directly thereto in the usual manner. The reeds E², however, are set at different inclinations so as to connect the equally spaced cam yokes with the unequally spaced escapements, but the amount of this inclination is materially reduced by increasing the space between the individual cam yokes and the finger keys in the manner just referred to. As a matter of fact, in many instances the finger keys and intermediate parts lie substantially in the vertical planes of the corresponding magazine channels.

The front plate or raceway B through which the matrices pass to the assembly point is provided as usual with partitions or guides $b$ dividing it into channels, each communicating with two or more channels of the magazine as customary. It is pointed out, however, that in the present arrangement, the location of the partitions or guides $b$ has been changed to accord with the new spacing of the magazine channels and with the largest matrices that may be stored therein, the minimum number of partitions being employed for the purpose. In this way, the assembling mechanism, which comprises the front plate B, inclined conveyer belt B¹ and the assembler B², is enabled to coöperate properly with the improved magazine and the extra thick or display matrices.

In the foregoing description, the magazine A has been considered as of full length and in one piece, as customary. As a matter of fact, however, and in accordance with a further feature of my invention, it is divided transversely slightly below its median line into lower and upper sections 1ᴬ and 2ᴬ, respectively. These sections are supported on the base frame A¹ with the complementary portions of the grooves $a$ in proper registry, the upper ends of the ribs $a^1$ of the lower section being beveled or chamfered, as indicate in Fig. 5, to compensate for any slight irregularity in this respect. Ordinarily and in most cases, the entire font of matrices is stored in the lower section 1ᴬ only, the number of matrices in the font being reduced so that all of the matrix columns will stop short of the upper section 2ᴬ. As herein constructed, the parts permit the use of ten individual matrices in each matrix column, which number in practice has been found to be entirely satisfactory for the larger sizes employed. In such an arrangement, therefore, the lower section 1ᴬ constitutes the magazine proper, and the upper section 2ᴬ merely a conductor to carry and guide the matrices thereto from the magazine entrance. Hence, in interchanging fonts, it is necessary only to remove the lower section 1ᴬ, leaving the upper section 2ᴬ in place on the base frame to coöperate with the substitute magazine sections. This construction is very advantageous, in that it not only enables the magazines proper and the matrix fonts to be manufactured at little cost, but in addition it so materially reduces the weight of the parts, that the matrix fonts, or the magazines containing them, may be interchanged in the least possible time and with the minimum of effort. As a result, also, the user may keep on hand at relatively small expense a great variety of matrix fonts suitable for all classes of work. These advantages are realized from the employment of the intermediate conductor which permits the proper magazine to be made of less than full length and hence capable alone of containing the complete matrix font when the number of individual matrices therein is reduced accordingly. In this connection, it should be noted that if the magazine were merely shortened, it would have to be widened at its upper end to enable it to receive the matrices from the magazine entrance, or else the entrance itself made narrower, quite apart from the fact that the assembling and distributing mechanisms would have to be brought closer together. In the present arrangement, on the other hand, the assembling and distributing mechanisms are arranged with reference to the normal full length magazine so as to permit its use in the machine when desired, and the shorter magazine when in use is arranged in operative relation to the assembling mechanism and is enabled to coöperate with the distributing mechanism by means of the conductor which connects it with the magazine entrance, thereby compensating for the difference in width between the magazine entrance and the upper end of the shorter magazine, as well as the distance between the assembling and distributing mechanisms.

In order that the former may be removed independently, the magazine sections 1$^A$ and 2$^A$ are attached to the base frame A' by separate means. The section 1$^A$ is provided on its upper side with the customary transverse reinforcing ribs $a^2$, resting upon the base frame, and the foremost one of which is engaged with the upstanding shoulders A$^8$ thereon (Fig. 2), this engagement of the parts insuring the retention of the magazine section in proper position on the frame, while permitting it to be lifted therefrom when desired. The rearmost one of the rails $a^2$ (Fig. 5) is extended beyond the edges of the magazine so that it may be supported in a suitable rack. The upper magazine section or conductor 2$^A$ is similarly formed with transverse ribs $a^3$, resting upon the base frame A', but in this instance, the foremost one of the rails is slightly thicker than the others and is seated in a corresponding recess formed in the upper face of the base frame, whereby the section is securely though detachably held in position thereon. Before removing the magazine section 1$^A$, it is customary to swing the latter upwardly to disengage it from the underlying bank of escapements (which are mounted in the fixed machine frame) and locate it above the front plate B, as shown by the dotted lines in Fig. 2, when it may be drawn forwardly from the front of the machine. To effect this swinging of the base frame A$^1$, it is pivotally mounted at its upper end upon the transverse rod A$^2$ and is provided at its lower end with the pair of cams A$^3$ fast to the opposite ends of the transverse rock shaft A$^4$ journaled in the base frame, the cams being arranged to coöperate with the rollers A$^5$ on the machine frame and being operated by the arm A$^6$ fast to the rock shaft A$^4$, all as shown and described in detail in either of the patents to T. S. Homans, Nos. 814,542 and 829,868.

It may happen that matrices will become lodged between the two magazine sections at the time of removal of the lower one. Hence the top plate of the upper section 2$^A$ is provided at its lower end with a hinged plate $a^4$ (Figs. 2 and 5), which will yield in such event and thus avoid injury to the parts.

In the use of fonts comprising thinner matrices, as for ordinary composition as distinguished from display work, it may be desired to employ a larger quantity of matrices in the machine. In this event, the matrices may be stored in both magazine sections 1$^A$ and 2$^A$, the latter allowing the matrix columns to extend all the way back to the magazine entrance. However, to secure same result, it is preferred to remove the two magazine sections and substitute an integral magazine of full length, this being far more practical.

The improvements last discussed in their broader aspects are presented in my prior Letters Patent No. 1,536,534, wherein they are illustrated in connection with a supplemental magazine adapted to contain an auxiliary font of matrices. They are herein adapted to the main magazine which contains a much greater number of matrix channels suitable for ordinary composition, and in making such adaptation, both the lower and upper sections of the magazine are made of trapezoidal form so that the matrices may be distributed into the lower section without widening it at either its discharge or receiving end, and so that the sections may coöperate with the other parts of the machine in precisely the same way as a full length integral magazine, which may be substituted therefor. It has been seen that, in the present arrangement, the channels of the intermediate conductor section converge from the upper to the lower end thereof so as to guide the matrices from the magazine entrance (which is of full width and whose channels are parallel) to the corresponding channels of the remote magazine section (which is narrower than the magazine entrance and whose channels also converge toward their lower ends). It is further pointed out that the lower magazine section or magazine proper is therefore not only provided with a reduced number of channels spaced throughout the entire width thereof as before described, but in addition it is of less than full length, thus being adapted to contain a matrix font reduced both as to the number of different characters and as to the number of individual matrices for each character,—a construction which is of great utility. As before intimated, the rapid distribution of the matrices, as permitted by making the magazine of standard width at the receiving end of its upper section, compensates for the reduced number of individual matrices for each character and insures the return of the matrices to the lower magazine section before any of its channels are emptied, notwithstanding the great speed at which the matrices may be composed.

Figure 8:
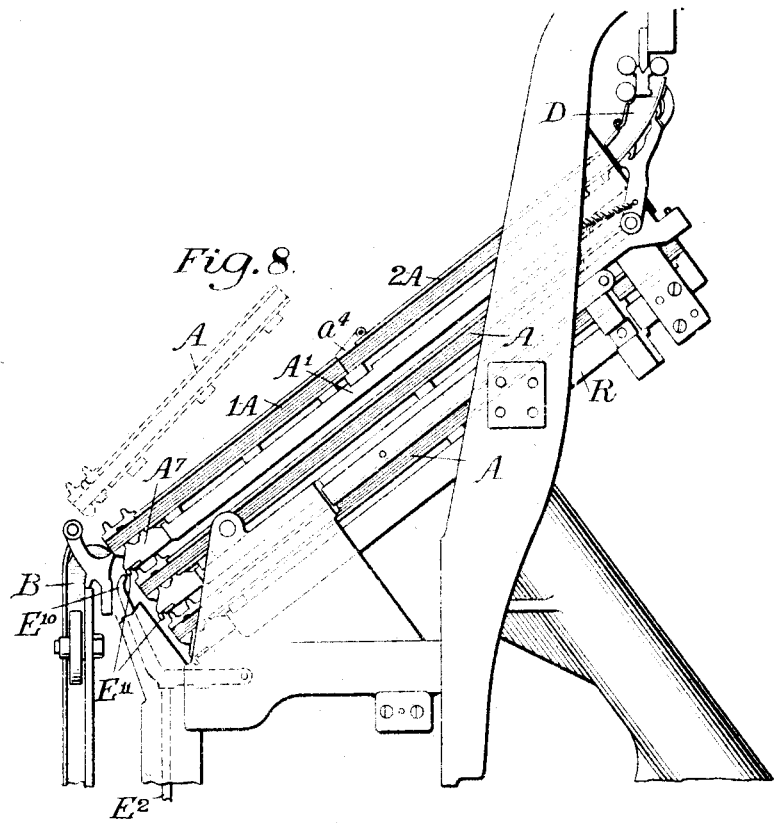
Fig. 8 is a side elevation of a shiftable multiple magazine machine equipped with my improvements.

In Figs. 8 and 9 the foregoing improvements have been incorporated in a machine of the shiftable multiple magazine variety of the kind known in the trade as "Model 8" and such as is illustrated and described in the Rogers U. S. Letters Patent No. 1,109,872. As shown, three distinct magazines A are carried by the shift frame R, composed in part of the two swinging base frames $A^1$, and arranged to be raised and lowered in the well known manner by the operation of the handle $R^1$ so as to bring any selected one of the magazines into operative relation to the front-plate or raceway B at the lower end, and the magazine entrance D and distributer C at the upper end. The two lower magazines are integral and of full length, while the top magazine is divided as before into lower and upper sections $1^A$ and $2^A$. However, this arrangement of the magazines may and will be varied according to the class of matter being composed. In other words, when the machine is used entirely for setting up "head letter" or display work for special composition, it is preferable that all of the magazines be of the divided variety so that the appropriate matrix fonts may be stored entirely in the lower magazine sections for ready and easy interchange. On the other hand, when the machine is used for setting up "straight matter" as for ordinary composition, it is preferable to employ all integral magazines of full length, so as to permit the employment of matrix fonts having a larger quantity of individual matrices and especially when it is desired or necessary to interchange such fonts frequently. In the drawings, the machine is shown as equipped with both kinds of magazines, so that it is possible to change from special composition to ordinary composition without interchanging the magazines, except of course when it becomes necessary to change the size or style of the matrix fonts. This changing as to size or style will be more frequent in the case of the larger matrix fonts, so that for this reason the divided magazine is arranged on the top base frame as shown, where the lower magazine section may be quickly and easily removed to permit the substitution of a new font (see Fig. 8). The manner in which the magazines are removed is fully illustrated and described in the above mentioned Rogers patent and need not therefore be repeated herein. It may be noted, however, that the lower section of the top magazine, being so light and small, may be lifted directly from the base frame if that be desired, although the operation is made simpler by first swinging the base frame upwardly as described in the Rogers patent.

It will be observed that the foregoing arrangement of the parts presents a construction wherein a plurality of magazines proper of different lengths may be employed conjointly, this capability being due to the use of the intermediate conductor for the shorter magazine. In other words, as the parts are arranged, the full length magazines coöperate directly with the magazine entrance to receive the matrices therefrom, while the shorter magazine is enabled to coöperate with the same entrance through the interposition of the conductor which receives the matrices therefrom and carries them to the distant magazine. In this way, the shorter magazines are enabled to coöperate with the assembling and distributing mechanisms, although the latter are arranged with reference to magazines of normal and greater length.

As in the Rogers patent, each magazine of the magazines A is provided with a bank of escapements $E^1$ mounted in the shift frame R, and actuated by the reeds $E^2$ through the medium of the pivoted levers $E^{10}$ and the sliding plungers $E^{11}$, which latter are arranged in the supporting bars $A^7$ of the different banks of escapements. The arrangement of these actuating devices is illustrated at the left in Fig. 10, where it will be observed that the pivoted levers $E^{10}$ are unequally spaced apart so as to lie in the vertical planes of the escapements and their actuating slides $E^{11}$, while the reeds $E^2$ as before described are arranged at different inclinations to connect the levers with the equally spaced cam yokes.

Since the issue of the Watson Patent No. 1,136,569 and my own Patents Nos. 1,136,534, 1,136,535 and 1,218,264, it has been common practice to equip these shiftable multiple magazine machines with supplemental magazines containing auxiliary matrix fonts or matrices which cannot be stored in the main magazines. Such an arrangement is very advantageous, in that it not only provides for a varied assortment of matrix fonts in the machine, but in addition it permits the mixture of different fonts in the same lines, due to the fact that different selected pairs of magazines may be brought into operative position for conjoint and simultaneous use. It is intended to make use of this arrangement in connection with the present improvements, and for that purpose, the construction disclosed in my Patent No. 1,218,264 has been adopted herein by way of example. Referring again to Fig. 9, there is arranged at the side of the magazines A a similar series of short and narrow supplemental magazines F of rectangular shape and each formed as customary with twenty-seven matrix channels. These magazines are carried by the shift frame $F^1$ slidably mounted in the machine frame so as to bring one or another thereof into operative relation to the throat $B^3$ opening into the channeled raceway B, which latter is extended sufficiently to coöperate with both series of magazines. The matrices are released from the supplemental magazines by escapements $J^1$ located in the throat $B^3$ and actuated through suitable connections $J^2$ from the separate keyboard J. The matrices are restored to the magazines by the distributor C which is extended longitudinally so as to coöperate with the magazines of both series, it being noted that the operative one of the supplemental magazines is connected to the extended portion of the distributer by the channeled conductor H and the further magazine entrance G. These parts and their mode of operation are precisely the same as illustrated in the patent last mentioned and therefore require no further description. However, to make the diagram of Fig. 10, complete, the actuating connections from the separate keyboard J to the supplemental magazines F are illustrated at the right in that figure, it being pointed out that connections between the finger keys and the reeds $J^2$ are the same as usual and consist of the cam yokes $J^3$, trip dogs $J^5$ and actuating slides $J^7$.

It will be appreciated that the use of these supplemental magazines in the present machine will be advantageous in a variety of ways. Thus in addition to their employment in connection with special auxiliary fonts as above mentioned, they may be used to hold extra characters of the main magazines, such for instance as the eighteen characters eliminated from the new fonts, it being remembered that the number of matrix channels is more than sufficient for such purpose. In this way, if it should be desired to employ matrix fonts comprising ninety characters, the main portions of such fonts may be stored in the magazines A and the remaining portions in the auxiliary magazines F, thus adapting the magazine to handle the ordinary ninety character fonts as well as the seventy-two character fonts herein proposed. In short, the arrangement is very flexible and serves greatly to increase the capacity of the machine.

As previously stated, I have shown my improvements only in preferred form and by way of example as applied to a linotype machine of the kind mentioned, but obviously many modifications and illustrations therein and in their mode of application will suggest themselves to those skilled in the art without departure from the scope of the invention.

Having thus described my invention, what I claim is as follows:

1. In a typographical machine for handling extra thick or display matrices, the combination of a magazine of substantially standard width at its discharge end but having materially less than the standard number of matrix channels to enable said magazine to accommodate a correspondingly reduced number of columns of extra thick or display matrices of the maximum size for that number, the said channels at their lower ends being unequally spaced apart throughout the entire width of the magazine and having the increased space afforded by the reduced number thereof apportioned among them in such manner that the distances between the various channels vary according to the setwise dimensions of said extra thick or display matrices, with means to control the release of the matrices from the magazine, together with assembling and distributing mechanisms constructed to coöperate with said magazine and display matrices.

2. In a typographical machine for handling extra thick or display matrices, the combination of a magazine of substantially standard width at its discharge end but having materially less than the standard number of matrix channels to enable said magazine to accommodate a correspondingly reduced number of columns of extra thick or display matrices of the maximum size for that number, the said channels at their lower ends being unequally spaced apart throughout the entire width of the magazine and having the increased space afforded by the reduced number thereof apportioned among them in such manner that the distances between the various channels vary according to the setwise dimensions of said extra thick or display matrices, with means to control the release of the matrices from the magazine, together with assembling and distributing mechanisms constructed to coöperate with said magazine and display matrices, the said assembling mechanism including an assembler wherein the matrices are composed in line, an inclined conveyer belt for delivering the matrices to the assembler, and a front plate of a width corresponding to that of the discharge end of the magazine and having vertical channels of varying lengths through which the matrices pass from the magazine to the conveyer belt.

3. In a typographical machine for handling extra thick or display matrices, the combination of a magazine comprising an independently removable lower section adapted to contain all of the matrices and an upper section adapted to serve merely as a conductor to carry the matrices from the distributing mechanism to the lower section, the said sectional magazine being of substantially standard width at the discharge end of its lower section as well as at the receiving end of its upper section but having materially less than the standard number of matrix channels to enable said magazine or magazine sections to accommodate a correspondingly reduced number of columns of extra thick or display matrices of the maximum size for that number, and the said channels at the discharge end of the lower section and at the receiving end of the upper section being unequally spaced apart throughout the entire width of the magazine and having the increased space afforded by the reduced number thereof apportioned among them in such manner that the distances between the various channels at the opposite ends of the magazine vary according to the setwise dimensions of said extra thick or display matrices, with means to control the release of the matrices from the magazine, assembling mechanism arranged at the discharge end of the lower magazine section and constructed to correspond with the spacing of the matrix channels at that end of the magazine, and distributing mechanism arranged at the receiving end of the upper magazine section and constructed to correspond with the spacing of the matrix channels at that end of the magazine.

4. In a typographical machine, the combination of a plurality of superposed removable magazines proper of different relative lengths, a single distributer therefor, and means for connecting said distributer to any selected one of the magazines.

5. In a typographical machine, the combination of two superposed removable magazines proper of different relative lengths, a single distributer, a magazine entrance leading from the distributer and arranged to coöperate directly with the longer magazine, and an intermediate conductor arranged to connect the magazine entrance to the shorter magazine.

6. In a typographical machine, the combination of two superposed magazines proper of different relative lengths, a supporting frame wherein said magazines are removably mounted and shiftable to bring one or the other into operative position, a single distributer, a magazine entrance to carry the matrices from the distributer to the operative magazine and arranged to coöperate directly with the longer magazine when the latter is in use, and an intermediate conductor carried by the shiftable supporting frame in position to connect the magazine entrance to the shorter magazine when the latter is in use.

7. A structure as specified in claim 6, characterized by the fact that the intermediate conductor therein referred to is also removably mounted in the shiftable supporting frame so that a longer magazine may be substituted for the shorter magazine when desired.

8. In a typographical machine, the combination with a distributer having a series of combinations divided into groups and running in proper sequence throughout the groups, the said combinations being arranged in systematic rotation within the groups and in interrupted rotation as between the groups, of a font of matrices having tooth-combinations to coöperate with those of the distributer and arranged in a similar manner throughout the font.

9. A distributer having a series of combinations divided into groups and running in proper sequence throughout the groups, the said combinations being arranged in systematic rotation within the groups and in interrupted rotation as between the groups.

10. In a typographical distributing machine, the combination of a distributer, a magazine entrance leading therefrom and having partitions dividing it into matrix channels of variant widths, and a magazine formed with sets of opposing grooves communicating with the respective entrance channels and separated by ribs of different widths, the said ribs being beveled or tapered at their upper ends to different extents according to widths or the distance between adjoining grooves in such manner that the grooves communicating with the wider entrance channels present flared mouths narrower than such channels.

11. In a typographical distributing machine, the combination of a distributer, a magazine entrance leading therefrom and having partitions dividing it into matrix channels of variant widths, and a magazine formed with sets of opposing grooves communicating with the respective entrance channels and separated by ribs of different widths, the said ribs being beveled or tapered at their upper ends to flare or widen the mouths of the grooves to a uniform extent throughout the magazine irrespective of the different widths of its ribs.

12. In a typographical machine, the combination of a distributer, a magazine entrance leading therefrom and comprising partitions dividing it into matrix channels of different widths and provided with supplemental guiding means located within the various channels in advance of the magazine and arranged to engage only the projecting ears of the matrices as they pass through said channels, and a magazine formed with sets of opposing grooves communicating with the entrance channels and separated by ribs of different widths, the said ribs being beveled or tapered to different extents according to width and in such manner that the grooves communicating with the wider entrance channels will present flared mouths narrower than such channels.

13. In a typographical machine, the combination of a distributer, a magazine entrance leading therefrom and comprising partitions dividing it into matrix channels of different widths, certain of said partitions being formed with guiding surfaces or flanges located in advance of the magazine to engage only the projecting ears of the matrices, and other of the partitions being provided with leaf sections or tongues formed with similar guiding surfaces or flanges also located in advance of the magazine, and a magazine formed with sets of opposing grooves communicating with the entrance channels and separated by ribs of variant widths, the said ribs being tapered or beveled at their upper ends to different extents according to width or the distance between adjoining grooves and in such manner that the flared mouths of some of the grooves will be as wide as the corresponding entrance channels, while the flared mouths of others will be narrower than the corresponding entrance channels.

14. In a typographical machine, the combination of a channeled magazine, and a magazine entrance therefor comprising a series of partitions dividing it into channels, at least one of said partitions being provided with a relatively inclined leaf section or tongue to produce a channel of gradually decreasing width toward its lower end, and supplemental guiding means located within said channel at its restricted portion in advance of the magazine to act only on the ears of the matrices before the latter enter said magazine.

15. In a typographical machine, the combination of a channeled magazine, and a magazine entrance therefor comprising a series of partitions dividing it into channels, at least one of said partitions having one side constituting a wall of one channel and provided at its other side with a leaf section or tongue extending at an inclination thereto to reduce the width of the adjoining channel toward its lower end, and supplemental guiding means located within the latter channel at its restricted portion in advance of the magazine in position to engage only the ears of the matrices before the latter enter said magazine.

16. In a typographical machine, the combination of a channeled magazine, and a magazine entrance therefor comprising a series of partitions dividing it into channels, at least one of said partitions having one side constituting a wall of one channel and provided at its opposite side with a leaf section or tongue projecting into the adjoining channel and formed in advance of the magazine with guiding flanges to engage only the ears of the matrices before the latter enter said magazine.

17. In a typographical machine, the combination of a channeled magazine, and a magazine entrance therefor comprising a series of parallel partions dividing it into channels, at least one of said partitions having one side constituting a wall of one channel and extending parallel with the other wall of said channel, and a leaf section or tongue connected at its upper end to the opposite side of said partition and extending downwardly at an inclination into the adjoining channel and provided at its lower end in advance of the magazine with guiding flanges to engage only the ears of the matrices before the latter enter said magazine.

18. In a typographical machine, the combination of a distributer, a channeled magazine entrance, a channeled conductor in position to receive the matrices therefrom, a removable channeled magazine arranged at the lower end of the conductor to receive the matrices from the latter, and means on the lower end of the conductor adapted, when engaged by matrices protruding from the upper end of the magazine in its removal, to yield and prevent binding of or injury to the parts.

19. In a typographical machine, the combination of a distributer, a channeled magazine entrance, a channeled conductor in position to receive the matrices therefrom and comprising top and bottom plates between which the matrices pass, a channeled magazine arranged at the lower end of the conductor in position to receive the matrices therefrom and adapted to be removed by a lifting action, and a terminal section hinged to the lower end of the top plate of the conductor, and adapted to yield when engaged by protruding matrices in the magazine when the latter is lifted.

In testimony whereof, I have affixed my signature hereto.

DAVID S. KENNEDY.